United States Patent
Nehse (10) Patent No.: US 7,694,072 B2
(45) Date of Patent: Apr. 6, 2010

(54) SYSTEM AND METHOD FOR FLEXIBLE PHYSICAL-LOGICAL MAPPING RAID ARRAYS

(75) Inventor: Paul Nehse, Livermore, CA (US)

(73) Assignee: Xyratex Technology Limited, Havant, Hampshire (GB)

( * ) Notice: Subject to any disclaimer, the term of this patent is extended or adjusted under 35 U.S.C. 154(b) by 200 days.

(21) Appl. No.: 11/662,745

(22) PCT Filed: Sep. 22, 2005

(86) PCT No.: PCT/US2005/034210

§ 371 (c)(1), (2), (4) Date: May 9, 2007

(87) PCT Pub. No.: WO2006/036810

PCT Pub. Date: Apr. 6, 2006

(65) Prior Publication Data

US 2008/0120462 A1    May 22, 2008

Related U.S. Application Data

(60) Provisional application No. 60/611,802, filed on Sep. 22, 2004.

(51) Int. Cl.
 *G06F 11/08* (2006.01)
 *G06F 12/00* (2006.01)
(52) U.S. Cl. .................. 711/114; 711/171; 711/172
(58) Field of Classification Search .................. 711/114, 711/170–172
 See application file for complete search history.

(56) References Cited

U.S. PATENT DOCUMENTS

| 5,636,356 | A |   | 6/1997  | Kakuta et al.    |       |
|-----------|---|---|---------|------------------|-------|
| 5,687,390 | A |   | 11/1997 | McMillan         |       |
| 5,708,769 | A | * | 1/1998  | Stallmo          | 714/6 |
| 5,727,181 | A |   | 3/1998  | Beglin et al.    |       |
| 5,974,503 | A |   | 10/1999 | Venkatesh et al. |       |

(Continued)

FOREIGN PATENT DOCUMENTS

WO    WO 01/31447 A1    5/2001

OTHER PUBLICATIONS

Paul Massiglia, The RAID Book, Feb. 1997, Peer-To-Peer Publishing, 6th Edition, pp. 68-82.*

(Continued)

*Primary Examiner*—Brian R Peugh
*Assistant Examiner*—Nicholas Simonetti
(74) *Attorney, Agent, or Firm*—Dickstein Shapiro LLP (57) ABSTRACT

A system, method and computer program for allocating physical memory from a group of N memory devices to logical volumes. A group of N memory devices are partitioned into a plurality of bands, each of the group of N memory devices sharing a portion of each of the plurality of bands. A cluster map for each of the plurality of bands is generated. The cluster maps indicate the physical address for each of a plurality of clusters. Each of the plurality of clusters are distributed equally over two or more of the N memory devices to ensure a specified level of redundancy for each of the plurality of bands. Each of the N memory devices share an approximately equal number of clusters. Available bands are determined and are allocated to a logical volume.

12 Claims, 5 Drawing Sheets

U.S. PATENT DOCUMENTS

| | | |
|---|---|---|
| 6,839,827 B1 * | 1/2005 | Beardsley et al. ........... 711/206 |
| 7,103,740 B1 * | 9/2006 | Colgrove et al. ............ 711/162 |
| 2003/0023811 A1 | 1/2003 | Kim et al. |
| 2003/0028727 A1 | 2/2003 | Kochiya |
| 2003/0097536 A1 | 5/2003 | Atherton et al. |
| 2003/0182503 A1 | 9/2003 | Leong et al. |
| 2005/0063217 A1 * | 3/2005 | Shiraishi et al. ............. 365/154 |

OTHER PUBLICATIONS

H. Jin et al., "Stripped mirroring RAID architecture", Journal of Systems Architecture, vol. 46, No. 6, Apr. 1, 2000, pp. 543-550.

* cited by examiner

Fig. 5

SYSTEM AND METHOD FOR FLEXIBLE PHYSICAL-LOGICAL MAPPING RAID ARRAYS

CROSS-REFERENCE TO RELATED APPLICATIONS

This application claims the benefit of U.S. Provisional Application Ser. No. 60/611,802, filed Sep. 22, 2004 in the U.S. Patent and Trademark Office, the entire content of which is incorporated by reference herein.

FIELD OF THE INVENTION

The present invention relates to allocation of physical resources for logical volumes in redundant arrays of inexpensive disk (RAID) arrays. Specifically, a system and method for assigning physical address space to logical data blocks is presented, wherein data space availability and system management flexibility are increased.

BACKGROUND OF THE INVENTION

Currently, redundant arrays of inexpensive disk (RAID) arrays are the principle storage architecture for large, networked computer storage systems. RAID architecture was first documented in 1987 when Patterson, Gibson, and Katz published a paper entitled, "A Case for Redundant Arrays of Inexpensive Disks (RAID)" (University of California, Berkeley). Fundamentally, RAID architecture combines multiple small, inexpensive disk drives into an array of disk drives that yields performance exceeding that of a Single Large Expensive Drive (SLED). Additionally, the array of drives appears as a single logical storage unit (LSU) or drive. Five types of array architectures, designated as RAID-1 through RAID-5, were defined by the Berkeley paper, each type providing disk fault-tolerance and offering different trade-offs in features and performance. In addition to the five redundant array architectures, a non-redundant array of disk drives is referred to as a RAID-0 array. RAID controllers provide data integrity through redundant data mechanisms, high speed through streamlined algorithms, and accessibility to stored data for users and administrators.

A networking technique that is fundamental to the various RAID levels is "striping," a method of concatenating multiple drives into one logical storage unit. Striping involves partitioning each drive's storage space into stripes, which may be as small as one sector (512 bytes) or as large as several megabytes. These stripes are then interleaved in round-robin style, so that the combined space is composed alternately of stripes from each drive. In effect, the storage space of the drives is shuffled like a deck of cards. The type of application environment, I/O or data intensive, determines whether large or small stripes should be used. The choice of stripe size is application dependant and affects the real-time performance of data acquisition and storage in mass storage networks. In data intensive environments and single-user systems which access large records, small stripes (typically one 512-byte sector in length) can be used, so that each record will span across all the drives in the array, each drive storing part of the data from the record. This causes long record accesses to be performed faster, because the data transfer occurs in parallel on multiple drives. Applications such as on-demand video/audio, medical imaging, and data acquisition, which utilize long record accesses, will achieve optimum performance with small stripe arrays.

Figure 1:
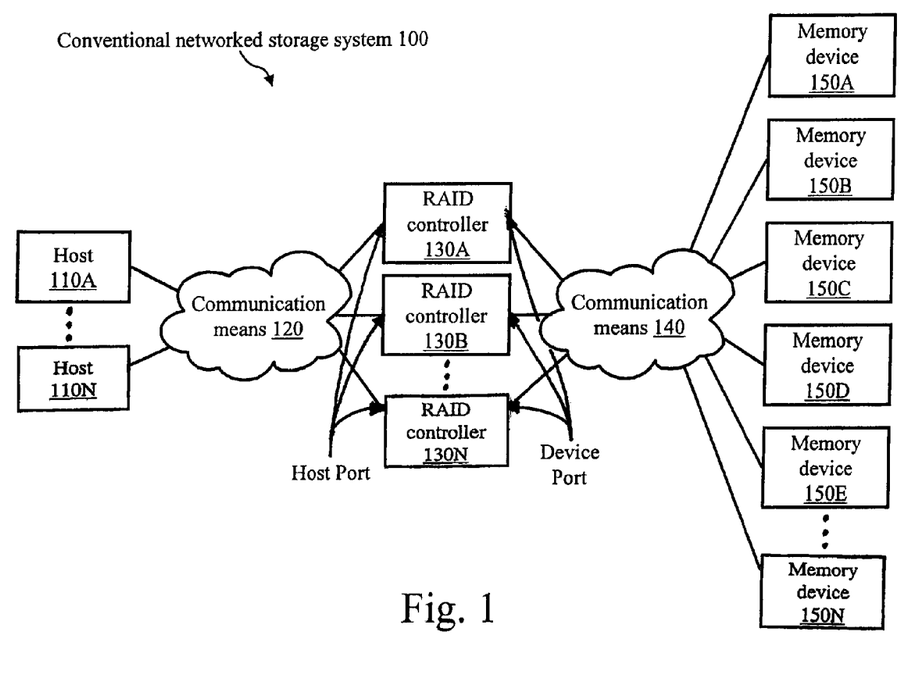
FIG. 1 is a block diagram of a conventional networked storage system.

FIG. 1 is a block diagram of a conventional networked storage system 100. Conventional networked storage system 100 includes a plurality of hosts 110A through 110N, where "N" is not representative of any other value "N" described herein. Hosts 110A through 110N are connected to a communications means 120 that is further coupled via host ports to a plurality of RAID controllers 130A, and 130B through 130N, where "N" is not representative of any other value "N" described herein. RAID controllers 130A through 130N are connected through device ports to a second communication means 140, which is further coupled to a plurality of memory devices 150A through 150N, wherein "N" is not representative of any other value "N" described herein.

Hosts 110A through 110N are representative of any computer systems or terminals that are capable of communicating over a network. Communication means 120 is representative of any type of electronic network that uses a protocol, such as Ethernet. RAID controllers 130A through 130N are representative of any storage controller devices that process commands from hosts 110A through 110N and, based on those commands, control memory devices 150A through 150N. RAID controllers 130A through 130N also provide data redundancy, based on system administrator programmed RAID levels. Redundancy methods include data mirroring, parity generation, and/or data regeneration from parity after a device failure. Communication means 140 is any type of storage controller network, such as iSCSI or fibre channel. Memory devices 150A through 150N may be any type of storage device, such as, for example, tape drives, disk drives, non-volatile memory, or solid state devices. Although most RAID architectures use disk drives as the main storage devices, it should be clear to one skilled in the art that the invention embodiments described herein apply to any type of memory devices.

In operation, host 110A, for example, generates a read or a write request for a specific volume (e.g., volume 1), to which it has been assigned access rights. The request is sent through communication means 120 to the host ports of RAID controllers 130A through 130N. The command is stored in local cache in RAID controller 130B, for example, because RAID controller 130B is programmed to respond to any commands that request volume 1 access. RAID controller 130B processes the request from host 110A and determines, from mapping tables, the first physical memory device 150A through 150N address from which to read data or to write new data. If volume 1 is a RAID 5 volume and the command is a write request, RAID controller 130B generates new parity, stores the new parity to a parity memory device 150A through 150N via communication means 140, sends a "done" signal to host 110A via communication means 120, and writes the new host 110A data through communication means 140 to corresponding memory devices 150A through 150N. As a result, data is less susceptible to loss from memory device 150A through 150N failures and, generally, can be restored from parity and/or functional memory devices 150A through 150N, in the event of a failure. Any one of RAID controllers 130A through 130N also have the ability to take over control for a failed RAID controller 130A through 130N, such that system performance is unaffected or the effects are limited.

The operation of most standard RAID controllers is set at the Application Programming Interface (API) level. Typically, Original Equipment Manufactures (OEMs) bundle RAID networks and sell these memory systems to end users for network storage. OEMs bear the burden of customization of a RAID network and tune the network performance through an API. However, the degree to which a RAID system can be optimized through the API is limited; API does not adequately handle the unique performance requirements of various dissimilar data storage applications. Additionally, API does not provide an easily modifiable and secure format for proprietary OEM RAID configurations.

There is, therefore, a need for a RAID controller that has the capability to be adequately programmed for unique performance and data storage requirements. Furthermore, the RAID controller configuration should be easily modifiable by a user or system administrator. The general functions of the RAID controller, such as volume allocation, should be optimized to use fewer processing resources, in order to increase overall system performance. Finally, the RAID controller needs to allocate physical storage space to logical volumes in such a way that the majority of the storage capacity is utilized.

An example RAID controller with a mapping function for allocating physical disk space to logical volumes is described in U.S. Patent Application Publication No. 2003/0028727. The '727 application, entitled, "RAID Apparatus for Storing a Plurality of Same Logical Volumes on Different Disk Units," describes a RAID apparatus that has a plurality of same logical volumes allocated on a real volume. The real volume is designed so that a plurality of same logical volumes are respectively allocated on different physical disk units and a combination of a plurality of logical volumes allocated on each physical disk unit differs from one physical disk unit to another. This structure prevents uneven loading on the real volume from occurring because of uneven loads on the logical volumes.

The '727 application identifies the problem of physical disk device load balancing in a RAID architecture and offers a solution: allocating physical disk space such that equivalent logical volumes reside on separate physical disks for load balancing optimization. However, the '727 application fails to provide an effective means to allocate volumes to physical storage devices, such that there is greater flexibility in system design. Furthermore, the '727 application does not provide a means for mapping logical volumes to physical storage space with fewer processing cycle requirements. Finally, the '727 application does not provide a means for utilizing a greater amount of available space of each storage device, as compared to conventional methods.

It is therefore an object of this invention to provide a system and method for assigning physical storage space in a RAID array, such that maximum system flexibility is available to the administrator(s).

It is another object of the invention to provide a system and method for assigning physical storage space in a RAID array, such that fewer processing cycles are needed to maintain mapping information when a new volume is created.

It is yet another object of this invention to provide a system and method for assigning physical storage space in a RAID array, such that more data storage capacity is available.

BRIEF SUMMARY OF THE INVENTION

The present invention provides a method and a computer program are provided for allocating physical memory from a group of N memory devices to logical volumes. The method and program include the step of partitioning the group of N memory devices into a plurality of bands, each of the group of N memory devices sharing a portion of each of the plurality of bands. A cluster map for each of the plurality of bands is generated. The cluster maps indicate the physical address for each of a plurality of clusters. Each of the plurality of clusters are distributed equally over two or more of the N memory devices to ensure a specified level of redundancy for each of the plurality of bands. Each of the N memory devices share an approximately equal number of clusters. Available bands are determined and are allocated to a logical volume.

The present invention also provides a system for allocating physical memory to logical volumes. The system includes a group of N memory devices partitioned into a plurality of bands. Each of the group of N memory devices share a portion of each of the plurality of bands. Each of the plurality of bands has a cluster map. Each cluster map indicates the physical address for each of a plurality of clusters. Each of the plurality of clusters are equally distributed over two or more of the N memory devices to ensure a specified level of redundancy for each of the plurality of bands. Each of the N memory devices share an approximately equal number of clusters. An array controller is also configured to determine if a band from the plurality of bands is available and to allocate an available band to a logical volume.

These and other aspects of the invention will be more clearly recognized from the following detailed description of the invention which is provided in connection with the accompanying drawings.

DETAILED DESCRIPTION OF THE INVENTION

The present invention is a method of allocating physical storage space to logical unit numbers (LUNs) or volumes that use a RAID controller. The method provides greater flexibility to the system administrator through the RAID controller, by systematically assigning various portions of physical space to single or multiple logical device groups. Each device group has specific rules for data usage and allocation. Each device group is further categorized into single or multiple sub-device groups. A special algorithm in the RAID controller arranges physical storage device space into logical units, or bands, that are readily allocated with little metadata overhead per system administrator commands. The physical space is allocated to logical volumes, according to system administrator specifications.

Figure 2:
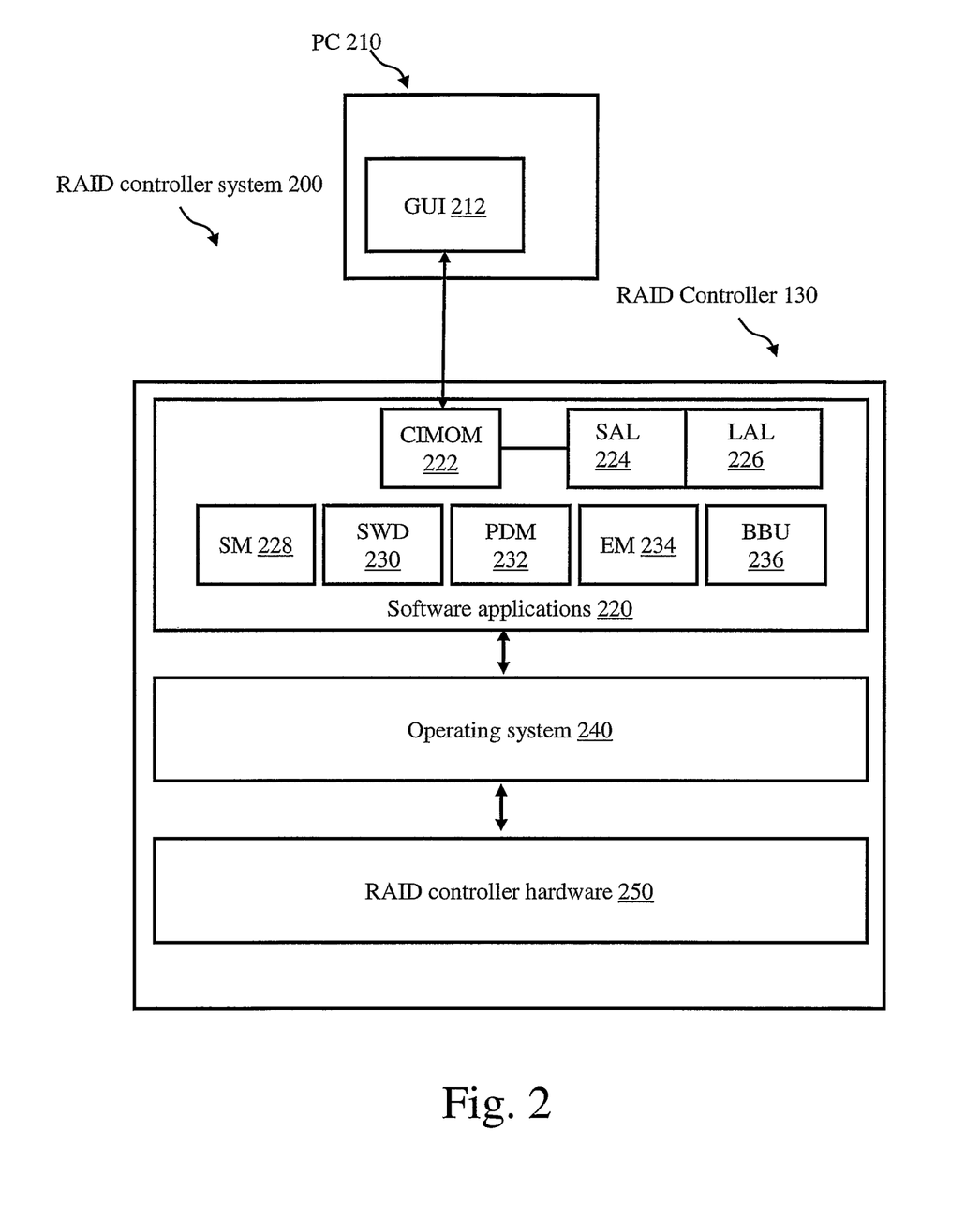
FIG. 2 is a block diagram of a RAID controller system, according to an exemplary embodiment of the invention.

FIG. 2 is a block diagram of a RAID controller system 200. RAID controller system 200 includes RAID controllers 130 and a general purpose personal computer (PC) 210. PC 210 further includes a graphical user interface (GUI) 212. RAID controllers 130 further include software applications 220, an operating system 240, and RAID controller hardware 250. Software applications 220 further include a common information module object manager (CIMOM) 222, a software application layer (SAL) 224, a logic library layer (LAL) 226, a system manager (SM) 228, a software watchdog (SWD) 230, a persistent data manager (PDM) 232, an event manager (EM) 234, and a battery backup (BBU) 236.

GUI 212 is a software application used to input personality attributes for RAID controllers 130. GUI 212 runs on PC 210. RAID controllers 130 are representative of RAID storage controller devices that process commands from hosts 110A through 110N and, based on those commands, control memory devices 150A through 150N (see FIG. 1). As shown in FIG. 2, RAID controllers 130 are an exemplary embodiment of the invention; however, other implementations of controllers may be envisioned here by those skilled in the art. RAID controllers 130 provide data redundancy, based on system-administrator-programmed RAID levels. This includes data mirroring, parity generation, and/or data regeneration from parity after a device failure. RAID controller hardware 250 is the physical processor platform of RAID controllers 130 that executes all RAID controller software applications 220 and consists of a microprocessor, memory, and all other electronic devices necessary for RAID control. Operating system 240 is an industry-standard software platform, such as Linux, for example, upon which software applications 220 can run. Operating system 240 delivers other benefits to RAID controllers 130. Operating system 240 contains utilities, such as a file system, that provide a way for RAID controllers 130 to store and transfer files. Software applications 220 include algorithms and logic necessary for the RAID controllers 130 and are divided into those needed for initialization and those that operate at run-time. Initialization software applications 220 consist of the following software functional blocks: CIMOM 222, which is a module that instantiates all objects in software applications 220 with the personality attributes entered; SAL 224, which is the application layer upon which the run-time modules execute; and LAL 226, a library of low-level hardware commands used by a RAID transaction processor.

Software applications 220 that operate at run-time include the following software functional blocks: system manager 228, a module that carries out the run-time executive; SWD 230, a module that provides software supervision function for fault management; PDM 232, a module that handles the personality data within software applications 220; EM 234, a task scheduler that launches software applications 220 under conditional execution; and BBU 236, a module that handles power bus management for battery backup.

SM 228 is responsible for allocating physical space to newly requested volumes and adding physical space to existing volumes when new devices are added to the system. SM 228 tales commands from the system administrator (e.g., assigning new volumes or creating new sub-device groups) and executes those commands. Commands that cannot be processed (because of lack of space available, for example) are returned as error messages to the system administrator. The volume allocation function of SM 228 is described in more detail in FIG. 4.

Figure 3:
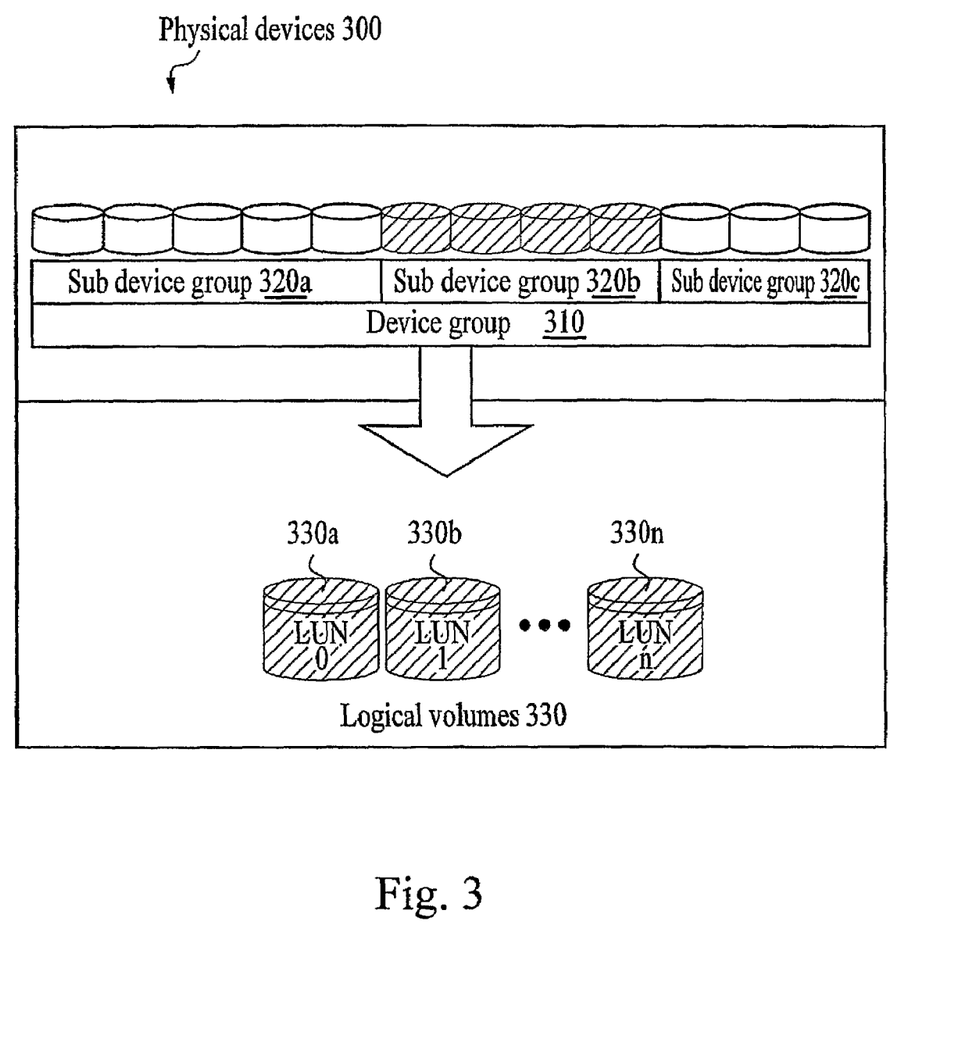
FIG. 3 shows a group of physical devices that have been grouped into a device group and further grouped into sub-device groups, according to an exemplary embodiment of the invention.

FIG. 3 shows an example of a group of physical devices 300 that have been grouped into a device group 310 and further grouped into sub-device groups 320a, 320b, and 320c by a system administrator through SM 228. A device group 310 may be assigned to multiple logical volumes 330, which include a plurality of LUNs 330a-330n that have varying sizes and RAID levels, where 'n' is not representative of any other value 'n' described herein. The maximum number of logical volumes 330 assigned to device group 310 depends on the size of logical volumes 330 and the number of sub-device groups 320 within device group 310.

A sub-device group 320 may include from one to sixteen physical devices; however, all devices must be the same class of storage. The class of storage is defined by the system administrator. It may be based on the types of devices in sub-device group 320, such as fibre channel or serial ATA, or based on physical characteristics, such as rotation speed or size, or based on logical considerations, such as function, department, or user. At system installation, SM 228 defaults all physical devices to the same class of storage. After installation, the system administrator may define new classes of storage.

SM 228 further divides each storage sub-device group 320 into bands, which are the smallest unit of logical storage assigned to a logical volume 330. By categorizing the storage area in such a manner, the granularity of each storage unit allows more physical space to be utilized. Table 1 shows an example of bands that stripe across all the devices within a sub-device group 320. There are n number of bands in sub-device group 320, depending on the capacity of each device.

TABLE 1

Band n + 11
Band n + 10
Band n + 9
Band n + 8
Band n + 7
Band n + 6
Band n + 5
Band n + 4
Band n + 3
Band n + 2
Band n + 1

N Bands

Band 9
Band 8
Band 7
Band 6
Band 5
Band 4
Band 3
Band 2
Band 1

Each band may be assigned to RAID 0 or RAID 5. There are three band formats: master volume data, mirror volume data, and snap volume data. A band may be assigned to contain master volume data, mirror volume data, or snap volume data, as defined below.

The master volume data band format is used when space is allocated to a master volume (e.g., volume 330a). The master volume may include one or more bands; however, all bands in that volume must be in the same sub-device group 320 (e.g., 320a). The amount of user space within a band varies, depending on the RAID level. The data band may be configured for either RAID level 0 or 5.

When space is allocated as a mirror to a master volume, the mirror band format is used. A mirror volume may include one or more bands, but all mirror bands associated with a master volume must be in a different sub-device group (e.g., sub-device group 320b) than the bands used for the master volume. The amount of user space within a band varies, depending on the RAID level. The mirror band may be configured for either RAID level 0 or 5 and is not required to be the same RAID level as the master volume.

The snap band format is used when space is allocated for a point in time copy of a master volume. The snap volume may include one or more bands, and all snap bands associated with a master volume may be in the same or different sub-device group. The amount of user space within a band varies, depending on the RAID level. The snap band may be configured for either RAID level 0 or 5 and is not required to be the same RAID level as the master volume.

Bands are expanded through the addition of devices to the sub-device group in which the bands reside. At anytime after sub-device group 320a is created, it may be expanded through addition of one or more devices to sub-device group 320a. After the devices are added, SM 228 migrates the existing bands to use the added devices. When the migration is complete, sub-device group 320a will include additional bands that may then be allocated to new or existing logical volumes 330.

Table 2 shows an example of a redundancy group (RGrp) mapping for various numbers (integer power of two only) of devices in a sub-device group for RAID 0 (no parity device is required) for a single band. Each band is further sub-divided into a plurality of RGrps, depending on the type of RAID level defined by the system administrator and the number of devices within a sub-device group 320. RGrp describes the RAID level, stripe size, number of devices, device path used, and location of the data within sub-device group 320a. The number of RGrps assigned to sub-device group 320a must be an integer power of two for RAID 0 and an integer power of two plus one additional device for RAID 5 (for parity data).

TABLE 2

Table 3 shows an example of an RGrp mapping of RGrps for integer power of two plus one sub-device groups 320 for RAID 5 (for parity data) for a single band in sub-device group 320b. The number of RGrps assigned to sub-device group 320b must be an integer power of two plus one additional device for RAID 5 (for parity data).

TABLE 3

Band 1 — Three Disk Sub Device Group

| RGrp 1 | RGrp 1 | RGrp 1 |
|---|---|---|
| Device 1 | Device 2 | Device 3 |

Band 1 — Five Disk Sub Device Group

| RGrp 1 | RGrp 1 | RGrp 1 | RGrp 1 | RGrp 1 |
|---|---|---|---|---|
| Device 1 | Device 2 | Device 3 | Device 4 | Device 5 |

Band 1 — Nine Disk Sub Device Group

| RGrp 1 | RGrp 1 | RGrp 1 | RGrp 1 | RGrp 1 | RGrp 1 | RGrp 1 | RGrp 1 | RGrp 1 |
|---|---|---|---|---|---|---|---|---|
| Device 1 | Device 2 | Device 3 | Device 4 | Device 5 | Device 6 | Device 7 | Device 8 | Device 9 |

Table 4 shows an example of an RGrp mapping of RGrps for a RAID 0 band in sub-device group 320b that does not include an integer power of two number of devices.

TABLE 4

Band 1 — Three Disk Sub Device Group

| RGrp 2 | RGrp 3 | RGrp 3 |
|---|---|---|
| RGrp 1 | RGrp 1 | RGrp 2 |
| Device 1 | Device 2 | Device 3 |

Band 1 — Five Disk Sub Device Group

| RGrp 4 | RGrp 5 | RGrp 5 | RGrp 5 | RGrp 5 |
|---|---|---|---|---|
| RGrp 3 | RGrp 3 | RGrp 4 | RGrp 4 | RGrp 4 |
| RGrp 2 | RGrp 2 | RGrp 2 | RGrp 3 | RGrp 3 |
| RGrp 1 | RGrp 1 | RGrp 1 | RGrp 1 | RGrp 2 |
| Device 1 | Device 2 | Device 3 | Device 4 | Device 5 |

Band 1 — Seven Disk Sub Device Group

| RGrp 6 | RGrp 6 | RGrp 6 | RGrp 7 | RGrp 7 | RGrp 7 | RGrp 7 |
|---|---|---|---|---|---|---|
| RGrp 4 | RGrp 4 | RGrp 5 | RGrp 5 | RGrp 5 | RGrp 5 | RGrp 6 |
| RGrp 2 | RGrp 3 | RGrp 3 | RGrp 3 | RGrp 3 | RGrp 4 | RGrp 4 |
| RGrp 1 | RGrp 1 | RGrp 1 | RGrp 1 | RGrp 2 | RGrp 2 | RGrp 2 |
| Device 1 | Device 2 | Device 3 | Device 4 | Device 5 | Device 6 | Device 7 |

In this example, rotating RGrps (RGrp1, RGrp2, RGrp3, RGrp4, RGrp5, RGrp6, and RGrp7) are used to map band. The number of RGrps required to map the entire band is equal to the number of devices within any sub-device group 320. For example, in Table 4, there are seven RGrps required to map a RAID 0 band in sub-device group 320 that includes seven devices. Each RGrp is striped across the devices, such that there is an integer power of two number of devices (e.g., 2, 4, 8, and so on, for RAID 0) with a specific RGrp and no device has two stripes of the same RGrp. For example, the seven disk sub-device group 320 in Table 4 cannot use eight devices for rotating a specific RGrp, because Device 1 would contain two stripes of RGrp1. The next available choice is four (integer power of 2), which satisfies the RGrp assignment rules by rotating onto four devices (RGrp1) before beginning a new RGrp (RGrp2).

Table 5 shows an example of a rotating RGrp mapping for sub-device groups 320 in RAID 5 band that do not equal integer powers of two plus one devices for parity (e.g., 3, 5, 9, and so on).

TABLE 5

Band 1 — Four Disk Sub Device Group

| RGrp 3 | RGrp 4 | RGrp 4 | RGrp 4 |
| RGrp 2 | RGrp 2 | RGrp 3 | RGrp 3 |
| RGrp 1 | RGrp 1 | RGrp 1 | RGrp 2 |
| Device 1 | Device 2 | Device 3 | Device 4 |

Band 1 — Six Disk Sub Device Group

| RGrp 5 | RGrp 6 | RGrp 6 | RGrp 6 | RGrp 6 | RGrp 6 |
| RGrp 4 | RGrp 4 | RGrp 5 | RGrp 5 | RGrp 5 | RGrp 5 |
| RGrp 3 | RGrp 3 | RGrp 3 | RGrp 4 | RGrp 4 | RGrp 4 |
| RGrp 2 | RGrp 2 | RGrp 2 | RGrp 2 | RGrp 3 | RGrp 3 |
| RGrp 1 | RGrp 1 | RGrp 1 | RGrp 1 | RGrp 1 | RGrp 2 |
| Device 1 | Device 2 | Device 3 | Device 4 | Device 5 | Device 6 |

Band 1 — Eight Disk Sub Device Group

| RGrp 7 | RGrp 7 | RGrp 7 | RGrp 8 | RGrp 8 | RGrp 8 | RGrp 8 | RGrp 8 |
| RGrp 5 | RGrp 6 | RGrp 6 | RGrp 6 | RGrp 6 | RGrp 6 | RGrp 7 | RGrp 7 |
| RGrp 4 | RGrp 4 | RGrp 4 | RGrp 4 | RGrp 5 | RGrp 5 | RGrp 5 | RGrp 5 |
| RGrp 2 | RGrp 2 | RGrp 3 | RGrp 3 | RGrp 3 | RGrp 3 | RGrp 3 | RGrp 4 |
| RGrp 1 | RGrp 1 | RGrp 1 | RGrp 1 | RGrp 1 | RGrp 2 | RGrp 2 | RGrp 2 |
| Device 1 | Device 2 | Device 3 | Device 4 | Device 5 | Device 6 | Device 7 | Device 8 |

Table 5 outlines the process for band RGrp mapping in a RAID 5 level that does not include an integer power of two number of devices plus a parity device in sub-device groups 320. As in the previous example, the number of RGrps (e.g., RGrp1, RGrp2, RGrp3, for example) is equal to the number of devices in each of sub-device groups 320. Therefore, there are four RGrps in the four device sub-device group 320, namely RGrp1, RGrp2, RGrp3, and RGrp4; six RGrps in the six device sub-device group 320, namely RGrp1, RGrp2, RGrp3, RGrp4, RGrp5, and RGrp6; and eight RGrps in the eight device sub-device group 320, namely RGrp1, RGrp2, RGrp3, RGrp4, RGrp5, RGrp6, RGrp7, and RGrp8. The number of devices an RGrp will stripe across is equal to an integer power of two plus one for the next lower integer power of two plus one multiple. For example, in the eight disk sub-device group 320, the next lower integer power of two plus one is four plus one, which is five. Therefore, each RGrp (RGrp1-8) stripes across five devices in an eight disk sub-device group 320. Similarly, the next lower integer power of two plus one for the six disk sub-device group is also four plus one, which is five. In the four disk sub-device groupband, thenext lower integer power of two plus one multiple is two plus one, which is three. Thus, four RGrps (RGrps1-4) stripe across three disks in a sub-device group 320.

Each enumerated RGrp striped across multiple devices ($2^n$ RAID level 0 logical volumes or $2^n+1$ RAID level 5 logical volumes) is a cluster (see Tables 6 and 7). Thus, in Table 5, the RGrp1 sections together combine into a single cluster. Likewise, RGrp2 sections are another cluster, and so on. Thus, there are eight clusters in the eight disk sub-device group, six clusters in the six disk sub-device group, and four clusters in the four disk sub-device group.

A cluster is a configurable value that is used to manage user data within a sub-device group. It is not used for managing parity data for RAID 5 volumes. The minimum cluster size is 1 MB and must be an integer power of two. The cluster size is set before any device groups or volumes are created, and that size is used by all device groups within RAID controller 130.

Table 6 shows an example of a cluster map that includes clusters of a single band in an eight disk sub-device group 320 that is configured for a RAID 0 level.

TABLE 6

One Band

Sub Device Group

| | | | | | | | | |
|---|---|---|---|---|---|---|---|---|
| Cluster n + 10 | RGrp 1 | RGrp 1 | RGrp 1 | RGrp 1 | RGrp 1 | RGrp 1 | RGrp 1 | RGrp 1 |
| Cluster n + 9 | RGrp 1 | RGrp 1 | RGrp 1 | RGrp 1 | RGrp 1 | RGrp 1 | RGrp 1 | RGrp 1 |
| Cluster n + 8 | RGrp 1 | RGrp 1 | RGrp 1 | RGrp 1 | RGrp 1 | RGrp 1 | RGrp 1 | RGrp 1 |
| Cluster n + 7 | RGrp 1 | RGrp 1 | RGrp 1 | RGrp 1 | RGrp 1 | RGrp 1 | RGrp 1 | RGrp 1 |
| Cluster n + 6 | RGrp 1 | RGrp 1 | RGrp 1 | RGrp 1 | RGrp 1 | RGrp 1 | RGrp 1 | RGrp 1 |
| Cluster n + 5 | RGrp 1 | RGrp 1 | RGrp 1 | RGrp 1 | RGrp 1 | RGrp 1 | RGrp 1 | RGrp 1 |
| Cluster n + 4 | RGrp 1 | RGrp 1 | RGrp 1 | RGrp 1 | RGrp 1 | RGrp 1 | RGrp 1 | RGrp 1 |
| Cluster n + 3 | RGrp 1 | RGrp 1 | RGrp 1 | RGrp 1 | RGrp 1 | RGrp 1 | RGrp 1 | RGrp 1 |
| Cluster n + 2 | RGrp 1 | RGrp 1 | RGrp 1 | RGrp 1 | RGrp 1 | RGrp 1 | RGrp 1 | RGrp 1 |
| Cluster n + 1 | RGrp 1 | RGrp 1 | RGrp 1 | RGrp 1 | RGrp 1 | RGrp 1 | RGrp 1 | RGrp 1 |
| N Clusters | | | | | | | | |
| Cluster 20 | RGrp 1 | RGrp 1 | RGrp 1 | RGrp 1 | RGrp 1 | RGrp 1 | RGrp 1 | RGrp 1 |
| Cluster 19 | RGrp 1 | RGrp 1 | RGrp 1 | RGrp 1 | RGrp 1 | RGrp 1 | RGrp 1 | RGrp 1 |
| Cluster 18 | RGrp 1 | RGrp 1 | RGrp 1 | RGrp 1 | RGrp 1 | RGrp 1 | RGrp 1 | RGrp 1 |
| Cluster 17 | RGrp 1 | RGrp 1 | RGrp 1 | RGrp 1 | RGrp 1 | RGrp 1 | RGrp 1 | RGrp 1 |
| Cluster 16 | RGrp 1 | RGrp 1 | RGrp 1 | RGrp 1 | RGrp 1 | RGrp 1 | RGrp 1 | RGrp 1 |
| Cluster 15 | RGrp 1 | RGrp 1 | RGrp 1 | RGrp 1 | RGrp 1 | RGrp 1 | RGrp 1 | RGrp 1 |
| Cluster 14 | RGrp 1 | RGrp 1 | RGrp 1 | RGrp 1 | RGrp 1 | RGrp 1 | RGrp 1 | RGrp 1 |
| Cluster 13 | RGrp 1 | RGrp 1 | RGrp 1 | RGrp 1 | RGrp 1 | RGrp 1 | RGrp 1 | RGrp 1 |
| Cluster 12 | RGrp 1 | RGrp 1 | RGrp 1 | RGrp 1 | RGrp 1 | RGrp 1 | RGrp 1 | RGrp 1 |
| Cluster 11 | RGrp 1 | RGrp 1 | RGrp 1 | RGrp 1 | RGrp 1 | RGrp 1 | RGrp 1 | RGrp 1 |
| Cluster 10 | RGrp 1 | RGrp 1 | RGrp 1 | RGrp 1 | RGrp 1 | RGrp 1 | RGrp 1 | RGrp 1 |
| Cluster 9 | RGrp 1 | RGrp 1 | RGrp 1 | RGrp 1 | RGrp 1 | RGrp 1 | RGrp 1 | RGrp 1 |
| Cluster 8 | RGrp 1 | RGrp 1 | RGrp 1 | RGrp 1 | RGrp 1 | RGrp 1 | RGrp 1 | RGrp 1 |
| Cluster 7 | RGrp 1 | RGrp 1 | RGrp 1 | RGrp 1 | RGrp 1 | RGrp 1 | RGrp 1 | RGrp 1 |
| Cluster 6 | RGrp 1 | RGrp 1 | RGrp 1 | RGrp 1 | RGrp 1 | RGrp 1 | RGrp 1 | RGrp 1 |
| Cluster 5 | RGrp 1 | RGrp 1 | RGrp 1 | RGrp 1 | RGrp 1 | RGrp 1 | RGrp 1 | RGrp 1 |
| Cluster 4 | RGrp 1 | RGrp 1 | RGrp 1 | RGrp 1 | RGrp 1 | RGrp 1 | RGrp 1 | RGrp 1 |
| Cluster 3 | RGrp 1 | RGrp 1 | RGrp 1 | RGrp 1 | RGrp 1 | RGrp 1 | RGrp 1 | RGrp 1 |
| Cluster 2 | RGrp 1 | RGrp 1 | RGrp 1 | RGrp 1 | RGrp 1 | RGrp 1 | RGrp 1 | RGrp 1 |
| Cluster 1 | RGrp 1 | RGrp 1 | RGrp 1 | RGrp 1 | RGrp 1 | RGrp 1 | RGrp 1 | RGrp 1 |

The band is in an eight disk sub-device group 320 at RAID level 0 and includes n+10 clusters, which are all mapped to RGrp1. Since eight is an integer power of two, rotating RGrps are not required and, therefore, the band can use the same RGrp, in this case, RGrp1. For this configuration, only one RGrp is required to map all the clusters in the band.

Table 7 illustrates an example of a RAID 5 cluster map in which rotating redundancy is required, because the number of disks is not equal to an integer power of two plus one. Therefore, eight RGrps are required to map across all of the disks in sub-device group 320. This translates to eight clusters for that stripe. The RGrp rotation repeats for the next stripe, which translates into another group of eight clusters that has an offset of six (RGrp1 starts 6 stripes up from the first stripe). The third group of RGrps maps to a third set of eight clusters with an offset of eleven (RGrp1 starts again 11 stripes from the first stripe), and so on.

TABLE 7

| | Sub Device Group | | | | | | | |
|---|---|---|---|---|---|---|---|---|
| 6 Clusters mapped by 6 RGprs Cluster Offset n + 16 | RGrp 5 | RGrp 6 | RGrp 6 | RGrp 6 | RGrp 6 | RGrp 6 | | |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| 8 Clusters mapped by 8 RGprs Cluster Offset n + 11 | RGrp 7 | RGrp 7 | RGrp 7 | *RGrp 8* | *RGrp 8* | *RGrp 8* | *RGrp 8* | *RGrp 8* |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| 8 Clusters mapped by 8 RGprs Cluster Offset n + 6 | RGrp 7 | RGrp 7 | RGrp 7 | *RGrp 8* | *RGrp 8* | *RGrp 8* | *RGrp 8* | *RGrp 8* |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| 8 Clusters mapped by 8 RGprs Cluster Offset n + 1 | RGrp 7 | RGrp 7 | RGrp 7 | *RGrp 8* | *RGrp 8* | *RGrp 8* | *RGrp 8* | *RGrp 8* |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| One Band | N Clusters | | | | | | | |

TABLE 7-continued

| | | | | | | | | |
|---|---|---|---|---|---|---|---|---|
| 8 Clusters mapped by 8 RGprs Cluster Offset 16 | RGrp 7 | RGrp 7 | RGrp 7 | RGrp 8 | RGrp 8 | RGrp 8 | RGrp 8 | RGrp 8 |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| 8 Clusters mapped by 8 RGprs Cluster Offset 11 | RGrp 7 | RGrp 7 | RGrp 7 | RGrp 8 | RGrp 8 | RGrp 8 | RGrp 8 | RGrp 8 |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| 8 Clusters mapped by 8 RGprs Cluster Offset 6 | RGrp 7 | RGrp 7 | RGrp 7 | RGrp 8 | RGrp 8 | RGrp 8 | RGrp 8 | RGrp 8 |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |
| 8 Clusters mapped by 8 RGprs Cluster Offset 1 | RGrp 7 | RGrp 7 | RGrp 7 | RGrp 8 | RGrp 8 | RGrp 8 | RGrp 8 | RGrp 8 |
| | RGrp 5 | RGrp 6 | RGrp 6 | RGrp 6 | RGrp 6 | RGrp 6 | RGrp 7 | RGrp 7 |
| | RGrp 4 | RGrp 4 | RGrp 4 | RGrp 4 | RGrp 5 | RGrp 5 | RGrp 5 | RGrp 5 |
| | RGrp 2 | RGrp 2 | RGrp 3 | RGrp 3 | RGrp 3 | RGrp 3 | RGrp 3 | RGrp 4 |
| | RGrp 1 | RGrp 1 | RGrp 1 | RGrp 1 | RGrp 1 | RGrp 2 | RGrp 2 | RGrp 2 |

Groups of eight clusters are mapped by eight RGrps, and each set is identified by a specific offset in the map. The top of the band has space available to map six clusters only, because a single RGrp (for example, RGrp7) must span five disks (in this example), and there is not enough space to map RGrp7 or RGrp8, so the map completes at the end of RGrp6, which spans the required five disks.

Figure 4:
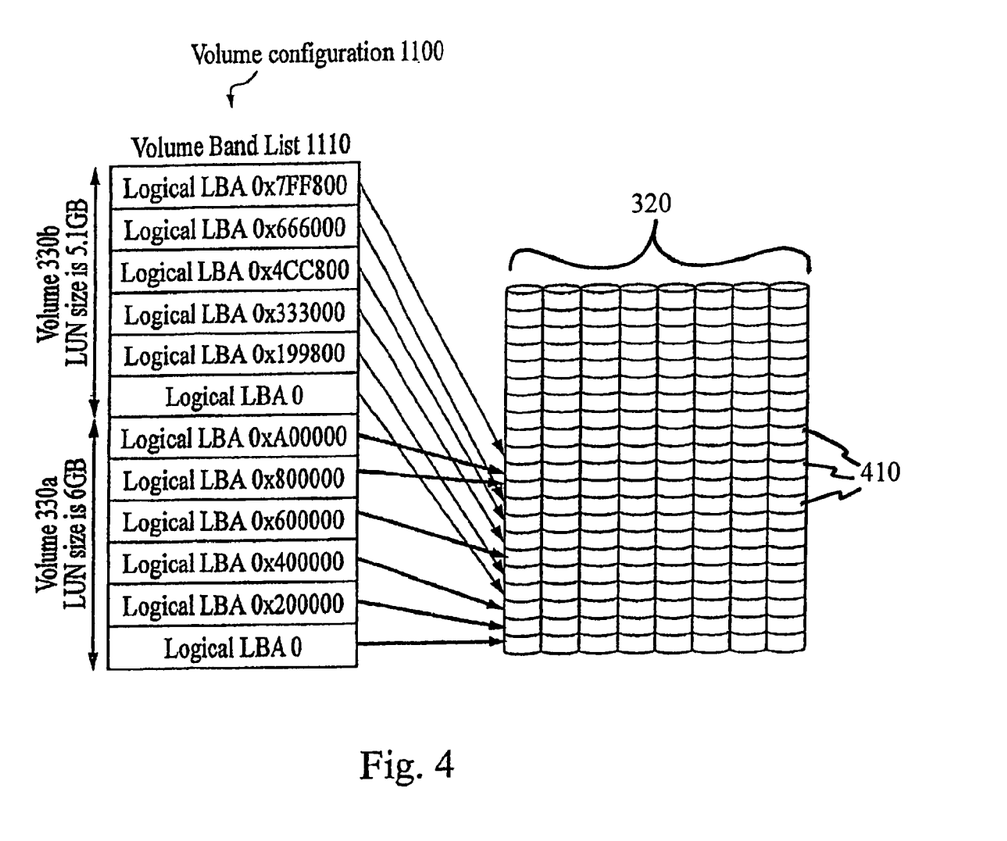
FIG. 4 shows an example of a volume configuration, according to an exemplary embodiment of the invention.

FIG. 4 shows an example of a volume configuration 1100, which includes a volume band list 1110, which further includes volumes 330a and 330b, when a create volume command is received by SM 228 for a RAID level 0 logical volume 330a and a RAID level 5 logical volume 330b. These logical volumes 330 only require one sub-device group 320, as no mirroring data in a separate sub-device group 320 is required. SM 228 allocates bands in a sub-device group 320a (for example) to logical volume 330a and assigns the bands a RAID level 0. When the bands are assigned to logical volume 330a, they move from a state of being free to that of being allocated. The bands assigned to logical volume 330a are not required to be contiguous. SM 228 also allocates bands in a sub-device group 320a (for example) to logical volume 330b and assigns the bands a RAID level 5. When the bands are assigned to logical volume 330b, they move from a state of being free to that of being allocated. FIG. 4 shows an example of SM 228 allocating bands 410 in a sub-device group 320 to two different logical volumes 330, a RAID 0 logical volume 330a that is 6 GB, and a RAID 5 logical volume 330b that is 5.1 GB. SM 228 allocates bands in a sub-device group 320a (for example) to logical volume 330a and assigns the bands a RAID level 0. When the bands are assigned to logical volume 330a, they move from a state of being free to that of being allocated. The bands assigned to logical volume 330a are not required to be contiguous. SM 228 also allocates bands in a sub-device group 320a (for example) to logical volume 330b and assigns the bands a RAID level 5. When the bands are assigned to logical volume 330b, they move from a state of being free to that of being allocated. FIG. 4 shows an example of SM 228 allocating bands in a sub-device group 320 to two different logical volumes 330, a RAID 0 logical volume 330a that is 6 GB, and a RAID 5 logical volume 330b that is 5.1 GB.

Figure 5:
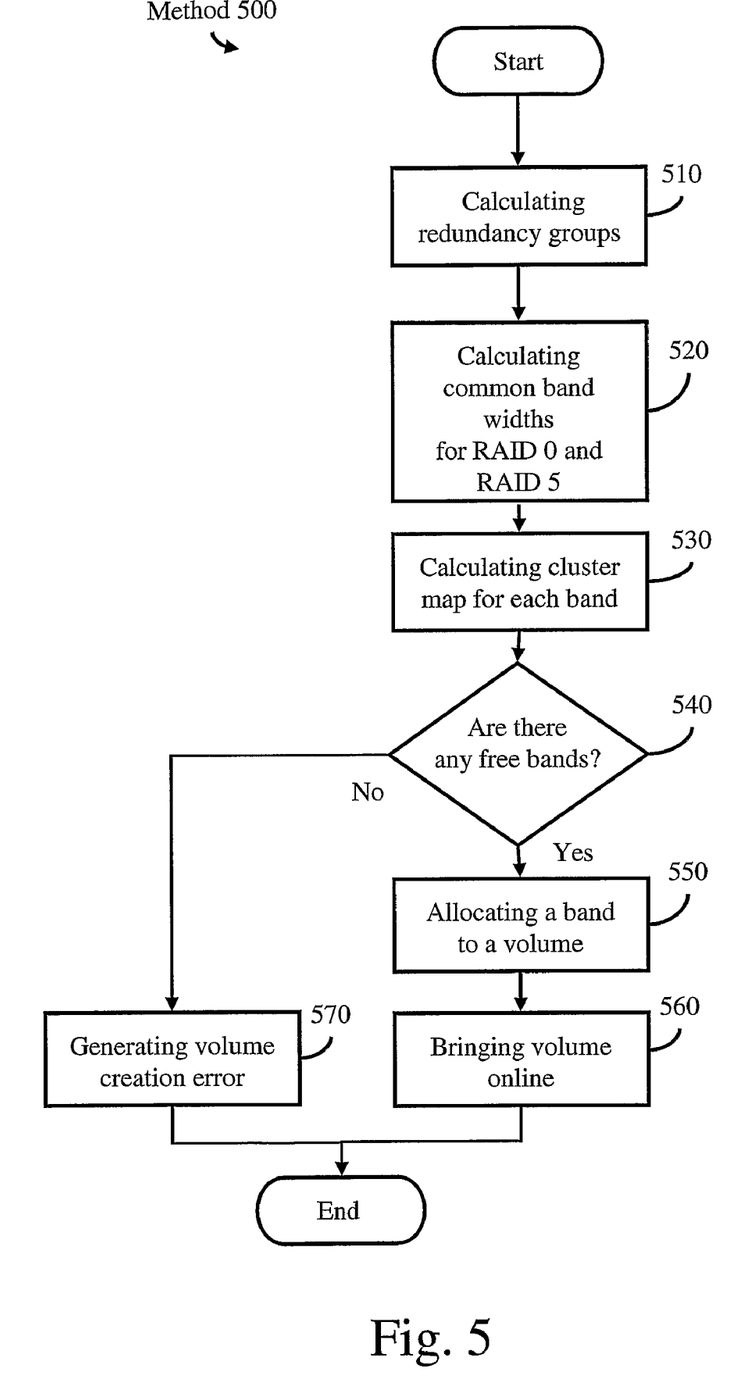
FIG. 5 is a flow diagram of a method of allocating bands to volumes, according to an exemplary embodiment of the invention.

FIG. 5 is a method 500 of allocating bands to volumes. Upon initialization, SM 228 divides each sub-device group into bands that may later be assigned to a RAID 0 or a RAID 5 volume. This process includes the following method steps:

Step 510: Calculating Redundancy Groups

In this step, SM 228 calculates the number of memory devices 150A through 150N in each sub-device group. Based on this value, SM 228 calculates the number of redundancy groups that are required to map the sub-device group for RAID 0 and again for RAID 5. For example, in an eight disk sub-device group, the number of redundancy groups that are required to map clusters for RAID 0 is one (integer power of two=true), and eight redundancy groups are required to map clusters for RAID 5 (integer power of two plus one=false). Method 500 proceeds to step 520.

Step 520: Calculating Common Band Widths for RAID 0 and RAID 5

In this step, SM 228 compares the RAID 0 redundancy group map to the RAID 5 redundancy group map for a particular sub-device group and determines a common 1 MB boundary, where a full redundancy group rotation ends. This marks a band boundary, where either RAID 0 or RAID 5 may be assigned to the band. For example, in the redundancy group maps of Tables 6 and 7, common band boundaries could be formed at multiples of every five plus one stripes. The known principle of using multiples of the least common denominator may be used to find common band boundaries. Method 500 proceeds to step 530.

Step 530: Calculating Cluster Map for Each Band

In this step, SM 228 calculates the cluster maps for each of the bands, as the band boundaries have already been defined, in the previous steps, for each sub-device group and redundancy groups that have been calculated for each band for both RAID 0 and RAID 5. Cluster maps for rotating redundancy are in a slightly different format from cluster maps, for which a single redundancy group maps all of the clusters in a band, as shown in Tables 6 and 7, respectively. Method 500 proceeds to step 540.

Step 540: Are There Any Free Bands?

In this decision step, SM 228 receives a request for a new volume creation, including information about the size of the requested volume, the desired sub-device group, and its RAID level. SM 228 analyzes the sub-device group for bands that are free and bypasses bands that are already allocated to other volumes. SM 228 checks whether there are any free bands left for allocation in the requested sub-device group. If yes, method 500 proceeds to step 550; if no, method 500 proceeds to step 570.

Step 550: Allocating a Band to a Volume

In this step, SM 228 allocates to the new volume the first available band that meets the requirements for the requested volume and assigns the requested RAID type to the band. SM 228 continues to scan for free bands, until the entire requested volume size has been satisfied with enough allocated bands from the sub-device groups. However, if there are not enough free bands to allocate to the new volume, SM 228 generates a message to the system administrator when the space allocated to the volume begins to reach capacity and informs the system administrator that data should be migrated to other volumes or that more memory devices 150A through 150N should be added to the sub-device group. Method 500 proceeds to step 560.

Step 560: Bringing Volume Online

In this step, SM 228 sets the state of the allocated bands from "free" to "allocated" and brings the new volume online by allowing host access. Method 500 ends.

Step 570: Generating Volume Creation Error

In this step, SM 228 generates an error message to the system administrator that indicates that there are no free bands in the desired sub-device group with which to allocate the newly requested volume. Method 500 ends.

By defining bands and creating cluster maps for each RAID type during initialization, rather than when a volume request is made, the RAID controller's processor has more throughput available for other system resources and thereby increases overall system performance over that of conventional networked storage systems. This method of allocation also allows more user flexibility in designing the system for various data storage needs, because the pre-mapped bands are assigned to a new volume, as defined by the user, rather than by the RAID controller that allocates volumes according to internal algorithms with little or no user input. Finally, this allocation method allows more memory device capacity to be utilized, because the bands align on the nearest megabyte boundaries and the way the clusters are laid out results in very little unused space on the devices. The only space that is not available to the user is the Meta Data area and a portion at the end of the device. The unmapped space at the end of the device is used for reassigning clusters during error recovery.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A method of allocating physical memory from a group of N memory devices to logical volumes, the method comprising:

partitioning the group of N memory devices into a plurality of bands, each memory device of the group of N memory devices sharing a portion of each of the plurality of bands;

generating a redundancy group map for each of multiple levels of redundancy, each redundancy group map indicating the location of redundancy groups on the N memory devices of the group of N memory devices, wherein band boundaries between adjacent bands of the plurality of bands are determined at shared boundaries of the redundancy group maps such that each band is compatible with multiple levels of redundancy;

generating a cluster map for each of the plurality of bands, each cluster map indicating the physical address for each of a plurality of clusters, each of the plurality of clusters equally distributed over two or more of the N memory devices of the group to ensure a specified level of redundancy for each of the plurality of bands, each of the N memory devices of the group sharing an approximately equal number of clusters from the plurality of clusters;

determining if a band is available; and allocating an available band to a logical volume, wherein a redundancy group map for a RAID 0 system is determined by:

setting a RAID 0 redundancy number equal to the highest integer power of two divisible into N;

calculating a number of RAID 0 redundancy groups needed in a RAID 0 architecture for the group of N memory devices, the number of RAID 0 redundancy groups being equal to one if N is equal to the RAID 0 redundancy number, and the number of RAID 0 redundancy groups being equal to N if N is not equal to the RAID 0 redundancy number; and generating a RAID 0 redundancy group map, wherein each RAID 0 redundancy group is distributed among a plurality of the N memory devices of the group of N memory devices equal to the RAID 0 redundancy number, each of the N memory devices of the group of N memory devices hosting an equal number of RAID 0 redundancy groups.

2. The method of claim 1, wherein the step of generating a cluster map further comprises mapping each RAID 0 redundancy group to a cluster.

3. A method of allocating physical memory from a group of N memory devices to logical volumes, the method comprising:
- partitioning the group of N memory devices into a plurality of bands, each memory device of the group of N memory devices sharing a portion of each of the plurality of bands;
- generating a redundancy group map for each of multiple levels of redundancy, each redundancy group map indicating the location of redundancy groups on the N memory devices of the group of N memory devices, wherein band boundaries between adjacent bands of the plurality of bands are determined at shared boundaries of the redundancy group maps such that each band is compatible with multiple levels of redundancy;
- generating a cluster map for each of the plurality of bands, each cluster map indicating the physical address for each of a plurality of clusters, each of the plurality of clusters equally distributed over two or more of the N memory devices of the group to ensure a specified level of redundancy for each of the plurality of bands, each of the N memory devices of the group sharing an approximately equal number of clusters from the plurality of clusters;
- determining if a band is available; and
- allocating an available band to a logical volume,
- wherein a redundancy group map for a RAID 5 system is determined by:
- setting a RAID 5 redundancy number equal to the highest integer power of two plus one divisible into N;
- calculating a number of RAID 5 redundancy groups needed in a RAID 5 architecture for the group of N memory devices, the number of RAID 5 redundancy groups being equal to one if N is equal to the RAID 5 redundancy number, and the number of RAID 5 redundancy groups being equal to N if N is not equal to the RAID 5 redundancy number; and
- generating a RAID 5 redundancy group map, wherein each RAID 5 redundancy group is distributed among a plurality of the N memory devices of the group of N memory devices equal to the RAID 5 redundancy number, each of the N memory devices of the group of N memory devices hosting an equal number of RAID 5 redundancy groups.

4. The method of claim 3, wherein the step of generating a cluster map further comprises mapping each RAID 5 redundancy group to a cluster.

5. A computer program stored on computer-readable media and used by a RAID controller, said program for allocating physical memory from a group of N memory devices to logical volumes, the program configured to:
- partition the group of N memory devices into a plurality of bands, each memory device of the group of N memory devices sharing a portion of each of the plurality of bands;
- generate a redundancy group map for each of multiple levels of redundancy, each redundancy group map indicating the location of redundancy groups on the N memory devices of the group of N memory devices, wherein band boundaries between adjacent bands of the plurality of bands are determined at shared boundaries of the redundancy group maps such that each band is compatible with multiple levels of redundancy;
- generate a cluster map for each of the plurality of bands, each cluster map indicating the physical address for each of a plurality of clusters, each of the plurality of clusters equally distributed over two or more of the N memory devices of the group to ensure a specified level of redundancy for each of the plurality of bands, each of the N memory devices of the group sharing an approximately equal number of clusters from the plurality of clusters;
- determine if a band is available; and
- allocate an available band to a logical volume,
- wherein a redundancy group map for a RAID 0 system is determined by
- setting a RAID 0 redundancy number equal to the highest integer power of two divisible into N;
- calculating a number of RAID 0 redundancy groups needed in a RAID 0 architecture for the group of N memory devices, the number of RAID 0 redundancy groups being equal to one if N is equal to the RAID 0 redundancy number, and the number of RAID 0 redundancy groups being equal to N if N is not equal to the RAID 0 redundancy number; and
- generating a RAID 0 redundancy group map, wherein each RAID 0 redundancy group is distributed among a plurality of the N memory devices of the group of N memory devices equal to the RAID 0 redundancy number, each of the N memory devices of the group of N memory devices hosting an equal number of RAID 0 redundancy groups.

6. The computer-readable media of claim 5, wherein the step of generating a cluster map further comprises mapping each RAID 0 redundancy group to a cluster.

7. A computer program stored on computer-readable media and used by a RAID controller, said program for allocating physical memory from a group of N memory devices to logical volumes, the program configured to:
- partition the group of N memory devices into a plurality of bands, each memory device of the group of N memory devices sharing a portion of each of the plurality of bands;
- generate a redundancy group map for each of multiple levels of redundancy, each redundancy group map indicating the location of redundancy groups on the N memory devices of the group of N memory devices, wherein band boundaries between adjacent bands of the plurality of bands are determined at shared boundaries of the redundancy group maps such that each band is compatible with multiple levels of redundancy;
- generate a cluster map for each of the plurality of bands, each cluster map indicating the physical address for each of a plurality of clusters, each of the plurality of clusters equally distributed over two or more of the N memory devices of the group to ensure a specified level of redundancy for each of the plurality of bands, each of the N memory devices of the group sharing an approximately equal number of clusters from the plurality of clusters;
- determine if a band is available; and
- allocate an available band to a logical volume,
- wherein a redundancy group map for a RAID 5 system is determined by:
- setting a RAID 5 redundancy number equal to the highest integer power of two plus one divisible into N;
- calculating a number of RAID 5 redundancy groups needed in a RAID 5 architecture for the group of N memory devices, the number of RAID 5 redundancy groups being equal to one if N is equal to the RAID 5 redundancy number, and the number of RAID 5 redundancy groups being equal to N if N is not equal to the RAID 5 redundancy number; and
- generating a RAID 5 redundancy group map, wherein each RAID 5 redundancy group is distributed among a plurality of the N memory devices of the group of N memory devices equal to the RAID 5 redundancy number, each of the N memory devices of the group of N memory devices hosting an equal number of RAID 5 redundancy groups.

8. The computer-readable media of claim 7, wherein the step of generating a cluster map further comprises mapping each RAID 5 redundancy group to a cluster.

9. A system for allocating physical memory to logical volumes, comprising:

a group of N memory devices, partitioned into a plurality of bands, each memory device of the group of N memory devices sharing a portion of each of the plurality of bands;

a redundancy group map for each of multiple levels of redundancy, each redundancy group map indicating the location of redundancy groups on the N memory devices of the group of N memory devices, wherein band boundaries between adjacent bands of the plurality of bands are located at shared boundaries of the redundancy group maps such that each band is compatible with multiple levels of redundancy;

a cluster map for each of the plurality of bands, each cluster map indicating the physical address for each of a plurality of clusters, each of the plurality of clusters equally distributed over two or more of the N memory devices of the group to ensure a specified level of redundancy for each of the plurality of bands, each of the N memory devices of the group sharing an approximately equal number of clusters from the plurality of clusters;

an array controller configured to determine if a band from the plurality of bands is available and to allocate an available band to a logical volume, wherein a redundancy group map for a RAID 0 system comprises:

a RAID 0 redundancy number equal to the highest integer power of two divisible into N;

a number of RAID 0 redundancy groups, the number of RAID 0 redundancy groups being equal to one if N is equal to the RAID 0 redundancy number, and the number of RAID 0 redundancy groups being equal to N if N is not equal to the RAID 0 redundancy number; and a RAID 0 redundancy group distribution, wherein each RAID 0 redundancy group is distributed among a plurality of the N memory devices of the group of N memory devices equal to the RAID 0 redundancy number, each of the N memory devices of the group of N memory devices hosting an equal number of RAID 0 redundancy groups.

10. The system of claim 9, wherein each RAID 0 redundancy group is mapped to a cluster.

11. A system for allocating physical memory to logical volumes, comprising:

a group of N memory devices, partitioned into a plurality of bands, each memory device of the group of N memory devices sharing a portion of each of the plurality of bands;

a redundancy group map for each of multiple levels of redundancy, each redundancy group map indicating the location of redundancy groups on the N memory devices of the group of N memory devices, wherein band boundaries between adjacent bands of the plurality of bands are located at shared boundaries of the redundancy group maps such that each band is compatible with multiple levels of redundancy;

a cluster map for each of the plurality of bands, each cluster map indicating the physical address for each of a plurality of clusters, each of the plurality of clusters equally distributed over two or more of the N memory devices of the group to ensure a specified level of redundancy for each of the plurality of bands, each of the N memory devices of the group sharing an approximately equal number of clusters from the plurality of clusters;

an array controller configured to determine if a band from the plurality of bands is available and to allocate an available band to a logical volume, wherein a redundancy group map for a RAID 5 system comprises:

a RAID 5 redundancy number equal to the highest integer power of two plus one divisible into N;

a number of RAID 5 redundancy groups, the number of RAID 5 redundancy groups being equal to one if N is equal to the RAID 5 redundancy number, and the number of RAID 5 redundancy groups being equal to N if N is not equal to the RAID 5 redundancy number; and a RAID 5 redundancy group distribution, wherein each RAID 5 redundancy group is distributed among a plurality of the N memory devices of the group of N memory devices equal to the RAID 5 redundancy number, each of the N memory devices of the group of N memory devices hosting an equal number of RAID 5 redundancy groups.

12. The system of claim 11, wherein each RAID 5 redundancy group is mapped to a cluster.

* * * * *